United States Patent
Enomoto

(10) Patent No.: US 7,024,053 B2
(45) Date of Patent: Apr. 4, 2006

(54) METHOD OF IMAGE PROCESSING AND ELECTRONIC CAMERA

(75) Inventor: Hiromichi Enomoto, Tokyo (JP)

(73) Assignee: Konica Corporation, Tokyo (JP)

(*) Notice: Subject to any disclaimer, the term of this patent is extended or adjusted under 35 U.S.C. 154(b) by 854 days.

(21) Appl. No.: 09/998,063

(22) Filed: Nov. 30, 2001

(65) Prior Publication Data

US 2002/0071042 A1    Jun. 13, 2002

(30) Foreign Application Priority Data

Dec. 4, 2000    (JP) .............................. 2000-368382

(51) Int. Cl.
 G06K 9/36    (2006.01)
 G09G 5/00   (2006.01)
 H04N 5/228   (2006.01)

(52) U.S. Cl. .................... 382/284; 348/222.1; 345/629

(58) Field of Classification Search ........ 382/274–275, 382/284, 312; 348/36, 222.1; 345/629; 355/43; 358/1.9; 396/55; 359/211
See application file for complete search history.

(56) References Cited

U.S. PATENT DOCUMENTS

| | | | | |
|---|---|---|---|---|
| 3,784,277 A | * | 1/1974 | Baker .......................... | 359/211 |
| 4,245,906 A | * | 1/1981 | Froehlich ..................... | 355/43 |
| 5,771,405 A | * | 6/1998 | Hirano ........................ | 396/55 |
| 5,982,350 A | * | 11/1999 | Hekmatpour et al. ....... | 345/629 |
| 6,813,040 B1 | * | 11/2004 | Uchino et al. ............... | 358/1.9 |

FOREIGN PATENT DOCUMENTS

| | | |
|---|---|---|
| JP | 05-161050 A | 6/1993 |
| JP | 09-091409 A | 4/1997 |
| JP | 2000-036032 A | 2/2000 |

* cited by examiner

*Primary Examiner*—Kanjibhai Patel
(74) *Attorney, Agent, or Firm*—Frishauf, Holtz, Goodman & Chick, P.C.

(57) ABSTRACT

An image processing method to make a composite image by pasting an image including a marked photographic object into another image, comprises the steps of, obtaining a degree of agreement between image data corresponding to a background image of the marked photographic object and image data corresponding to a background image of the other image, and a step of pasting an image of the marked photographic object into the other image in a state that the degree of agreement is highest.

11 Claims, 3 Drawing Sheets

METHOD OF IMAGE PROCESSING AND ELECTRONIC CAMERA

BACKGROUND OF THE INVENTION

This invention relates to a method of image processing capable of obtaining an image, which looks as if two photographic objects were photographed in the same shot by pasting together two images which are mostly the same in respect of the background image but different in the position of the objects, and an electronic camera.

There are often cases where plural persons go on a journey or the like and make snap shots; in such cases, generally speaking, it is inevitable that the person who makes the shot cannot become the object so far as it is not carried out a self-timer photographing with a tripod used. On the other hand, image processing technology has made progress, to put it into practice to paste plural images together. Hence, it is theoretically possible to add a shot-making person, who has not been able to be an object of photographing, in an image frame in which another person is the object by means of image processing.

For a conventional technology concerning an image processing as mentioned in the above, for example, the publication of the unexamined patent application 2000-036032 can be cited. This technology is such that a domain of a person is extracted by it that, first, only the background part is photographed, next, an image having the background with a person added, and makes the difference, and finally a composite image can be obtained by pasting the extracted domain of the person on the desired background image. However, according to such a technology, as described in the above, if it is intended to add a shot-making person who has not been able to be an object in an image frame in which another person has been the object, there is a problem that it is necessary to make three shots in total including a scene of only the background, which takes a time necessary for it.

Further, in the publication of the unexamined patent application H09-91409, a panoramic composition processing, in which overlapping end portions of two image frames are automatically connected, is disclosed. Further, in the publication of the unexamined patent application H05-161050, a digital still camera having an assistant means for connecting together two neighboring image frames is disclosed. However, these conventional technologies are ones for forming a panoramic image by pasting together the end portions of two different image frames; therefore, intrinsically it can not be employed in a use such that a shot-making person who has not been able to be an object of photographing is added in an image frame in which another person has been an object by means of image processing.

SUMMARY OF THE INVENTION

It is an object of this invention to provide a method of image processing which is capable of combining two image frames, which have been photographed for two persons separately with one person taken in one of them and the other person in the other in mostly the same background, by image processing to build a composite image looking as if the two persons were photographed as standing side by side, and an electronic camera which makes such a composition easy.

A method of image processing according to the first one of this invention is a method of image processing to make a composite image by pasting an image including a photographic object to remark on another image, characterized by it that a degree of agreement between image data corresponding to the background image of said photographic object and image data corresponding to the background image in said another image is obtained, and a composition processing is carried out in such a way that the image of said photographic object is pasted on said another image in a state that said degree of agreement is highest.

An electronic camera according to the second of this invention is characterized by it that said electronic camera comprises means for displaying in a semi-transparent manner the image of a first photographic object which has been photographed as well as displaying the image of a second photographic object which has been photographed in such a way that it is superposed on said displayed first image semi-transparently.

A method of image processing of the first of this invention is a method of image processing to carry out a composition in such a way that an image including a photographic object to remark is pasted on another image, wherein a degree of agreement between image data corresponding to the background image of said photographic object and image data corresponding to the background image of said another image is obtained, and composition processing is carried out in such a way that the image of said photographic object is pasted on said another image in a state that said degree of agreement is highest; therefore, an aimed image can be obtained by using a smaller number of image frames, and the joint portion of the image after pasting appears natural to make it possible to obtain an image giving little feeling of unnaturalness.

Further, it is desirable if the domain to be pasted can be designated.

Further, it is desirable if the image which has been subjected to the composition processing is to be displayed, because, for example, an operator can judge whether or not the image which has been composition-processed is suitable.

Further, it is desirable if an operator can carry out the movement of the pasting position of the image of the aforesaid photographic object onto the aforesaid another image and/or the enlargement or reduction of the domain to be pasted, because a composite image giving a feeling of less unnaturalness can be obtained.

Further, in pasting images together, it is desirable that the average brightness and the color balance of the image to paste and the image to catch it are obtained and processing is carried out with the both made to agree with each other.

Further, by correcting the distortion caused by the photographing optical system, more suitable composition processing can be performed.

An electronic camera of the second of this invention comprises means for displaying in a semi-transparent manner the image of a first photographic object which has been photographed as well as displaying the image of a second photographic object which has been photographed in such a manner that it is superposed on said displayed first image semi-transparently; therefore, for example, when said second photographic object is photographed after said first photographic object is photographed and its image data are memorized, if the image of said second photographic object is displayed as superposed on the image of said first photographic object in a semi-transparent manner by what is called preview display, an operator can find such a photographing position as to make the background of said second photographic object coincide with the background of said first photographic object as he is watching it, and by making shutter release when they coincide with each other, an image with a background which extremely approximates to the first one can be obtained. Besides, the word "to photograph" referred to herein means to convert an optical image into image signals by an image sensing means such as a CCD sensor.

Further, an electronic camera characterized by it that it comprises means for obtaining a composite position of two photographed frames of image and means for displaying the images superposed in a semi-transparent manner on the basis of the composite position.

Further, if a degree of agreement of two photographed images is obtained and the aforesaid electronic camera comprises a notifying means for notifying that said degree of agreement is higher than a specified value, an operator can be notified of it; thus, it is possible to urge him to make a suitable shutter release.

Further, it is desirable that the aforesaid notifying means gives out a continuous or intermittent sound (including a voice), but this invention is not limited to this, and also light emission from an LED, for example, is appropriate.

Further, it is desirable that, in the case where a plurality of images are photographed on the premise of pasting, in the header of the image corresponding to at least one of said images, the following are recorded: that the image photographed is an image to become the object of pasting and information concerning another image to become the object of pasting, because it makes processing at the time of composition easy.

Further, it is desirable that the positions of photographing when the aforesaid first photographic object is photographed and when the aforesaid second photographic object is photographed are approximately the same, and the backgrounds of said first photographic object and said second photographic object approximately agree with each other.

DETAILED DESCRIPTION OF THE PREFERRED EMBODIMENT

In the following, the embodiment of this invention will be explained with reference to the drawings.

Figure 1:
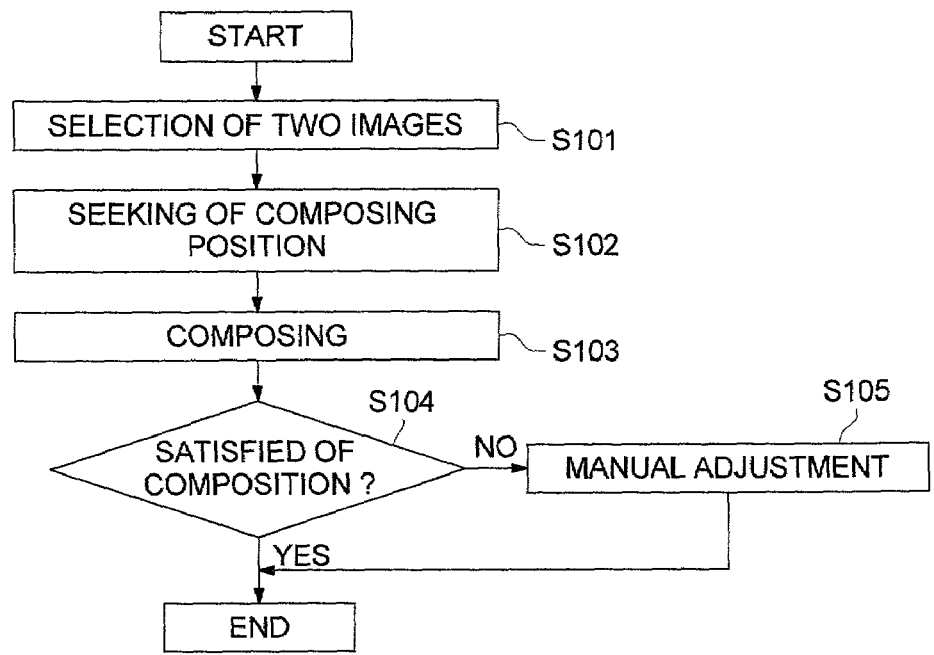
FIG. 1 is a flow chart for practicing a method of image processing according to the first example of the embodiment of the invention.
Figure 2:
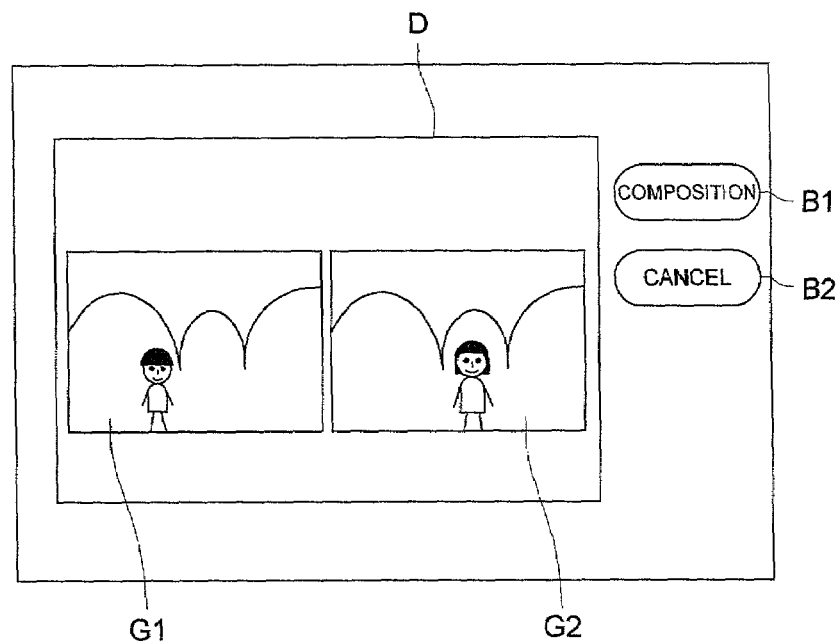
FIG. 2 is a drawing showing an example of images to be displayed on a display of a personal computer or the like on the basis of the flow chart shown in FIG. 1, when this method of image processing is practiced.
Figure 3:
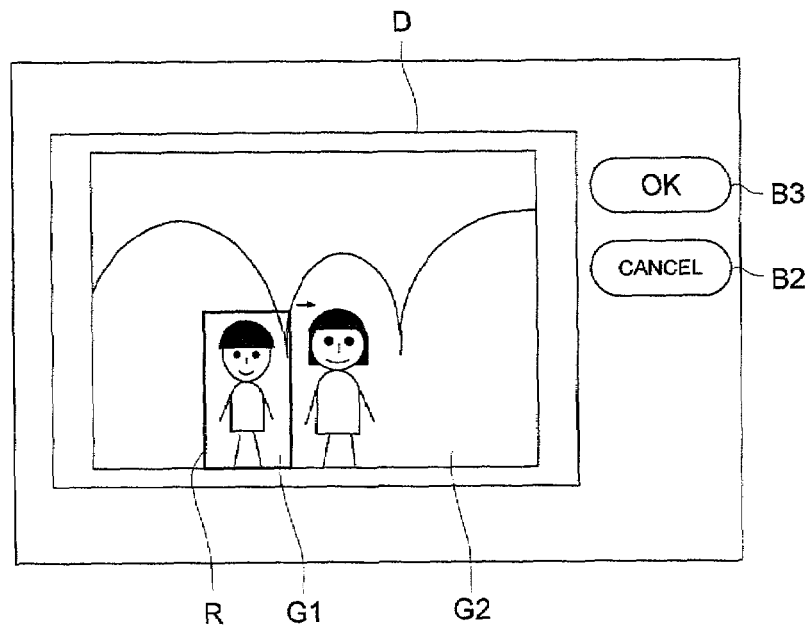
FIG. 3 is a drawing showing an example of images to be displayed on a display of a personal computer or the like on the basis of the flow chart shown in FIG. 1, when this method of image processing is practiced.
Figure 4:
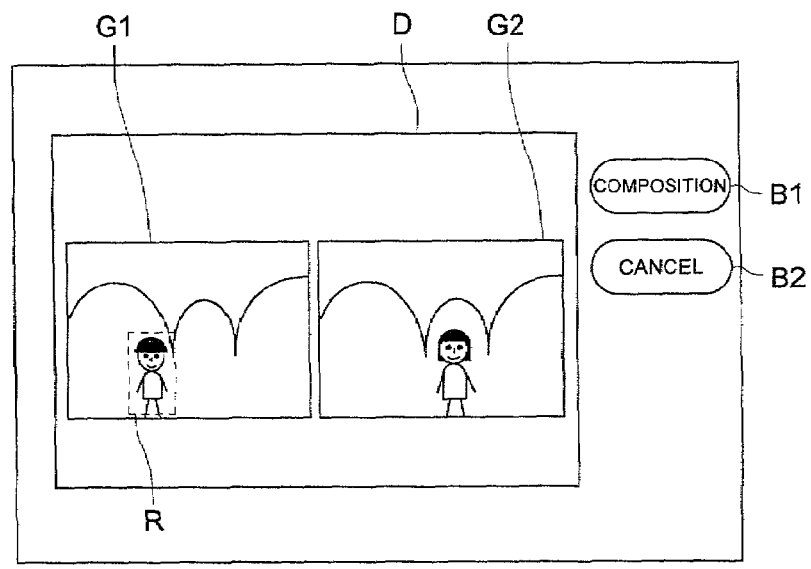
FIG. 4 is a drawing showing an example of images to be displayed on a display of a personal computer or the like on the basis of the flow chart shown in FIG. 1, when this method of image processing is practiced.

FIG. 1 is a flow chart for practicing a method of image processing according to the first example of the embodiment of this invention. FIG. 2 to FIG. 4 are drawings showing an example of images to be displayed on a display of a personal computer or the like respectively on the basis of the flow chart shown in FIG. 1, when this method of image processing is practiced.

It is desirable that a method of image processing of this invention is practiced through a software installed in a personal computer or the like. An operator who intends to compose an image selects a plurality of images to be combined out of the images corresponding to image data which have been memorized in the hard disk of a personal computer (not shown in the drawing) (step S101 in FIG. 1). Then, the selected plural images are displayed on its display.

In this example of the embodiment, the case where two frames of image are combined will be explained as an example. Various methods of displaying can be considered, but in this example, as shown in FIG. 2, it is assumed that images are displayed on a dialogue box D in the order of selection by the operator. At this time, the images to be displayed are made reduced images by thinning out the selected images. Assuming that the image which has been selected at first is denoted by G1, and the image which has been selected secondly is denoted by G2, as shown in FIG. 2, the image G1 comes to the left side and the image G2 comes to the right side on the display.

In the case where a "composition" button B1 indicated on the display is clicked by the operator, it causes the image G1 and the image G2 to be selected, and after that, processing for composition is carried out. For this processing, first, the composite position is obtained (step S102 in FIG. 1), next, on the basis of the composite position, pasting of two frames of image together is carried out (step S103 in FIG. 1). In addition, by clicking a cancel button B2, the procedures of processing described in the above can be canceled.

Now, it is desirable that the composite position is determined to be a position to make highest a degree of agreement between the image G1 and the image G2. For the method of calculating a degree of agreement, various ones can be thought of, but a method utilizing template matching is generally employed. It is of no problem to use the whole of the image G1 for the template, or it is of no problem to use only the central part of it for the template. In the following, the method of template matching will be explained.

(1) First, the edge of the template domain of the image G1 and the edge of the image G2 will be obtained. In order to obtain an edge, as an edge value, the absolute values of the difference in the sum of the digital image data values of the respective colors, namely, B+G+R, between an arbitrarily remarked pixel and each of four pixels adjacent to it are calculated, and further, the sum of these four values is calculated. If this value is greater than a specified value, the remarked pixel belongs to an edge, and if it is not greater than a specified value, the pixel does not belong to an edge. In this way, multi-valued image data are converted into binary image (that is, edge image) data. It is desirable that the threshold values for the images G1 and G2 in this case are set respectively to be such ones as to make the proportion of the number of pixels to be judged as belonging to an edge the same for the images G1 and G2 from the distribution of the edge values.

(2) Subsequently, for the binarized edge image data, the position where the patterns of edges agree best with each other is determined as the composite position.

(3) For example, at the time of combining two frames of image, in the case where two persons are photographed separately one by one with the same background, distortions in the horizontal direction and in the vertical direction owing to the difference in photographing condition and the optical characteristics of the lens become different for the two image frames, which makes the edge portions not coincide with the surrounding portions if the images are combined as they are. In order to avoid this phenomenon, it is appropriate that a domain to be pasted is enlarged or reduced gradually with a specified step in the horizontal and/or vertical direction, and the template matching procedures (1) and (2) are repeated for each step, to determine the magnification of enlargement (reduction) in the horizontal and/or vertical direction to be such a value as to make the degree of matching highest. In addition, also it is possible to correct the distortion of an image by means of an image processing software.

Next, on the basis of the composite position obtained in this way, the processing when the image G1 is pasted on the image G2 will be explained below.

(1) The average values of the digital image data values of the respective colors B, G, and R over the whole pixels of the two images G1 and G2 are obtained, and image data values of each pixel (hereinafter referred to as pixel values for simplicity) of G1 or G2 are converted so as to make these average values of one of the images agree with those of the other respectively. By doing this, a natural image composition giving no feeling of disorder can be actualized even in the case where the two images G1 and G2 have different color balances.

(2) In pasting images together, on the basis of the composite position, it is obtained the absolute value of the difference in the sum of the digital image data values of the respective colors B+G+R between corresponding pixels of the images G1 and G2. If this absolute value is not greater than a specified threshold value, for example, the pixel values of the image G1 are made the pixel values of the composite image. On the other hand, if it is greater than the specified threshold value for a certain pair of pixels, the edges of the respective specified domains including the remarked pixels are obtained, and the one having a larger sum of edge values is judged as the foreground; thus, the pixel values of this image for that pixel are made the pixel values of the composite image for that pixel.

In this way, two frames of image G1 and G2 can be combined to build a composite image. Further, there is a method in which, at the time of composition, by utilizing a notion that an important photographic object is a person, whether or not a human face is included in the domain including pixels having the absolute value of the difference larger than the specified threshold value is automatically recognized, and the domain including a human face is determined to be the foreground.

In pasting the domain that is judged as the foreground (foreground domain) in the procedures (1) and (2), by adding the pixel values of the foreground domain to those of the background domain corresponding to the former ones respectively in a specified proportion, the border portion becomes smooth, which enables a composition giving no feeling of disorder. To state it concretely, it can be considered that, in the central part of the foreground domain, the proportion of pixel values in the domain surrounded by a rectangle is made higher, and the nearer a pixel comes to the periphery, the higher the proportion of the pixel values of the background domain is made.

An image which has been composed in this way, as shown in FIG. 3 for example, is displayed in the dialogue box D of the display of a personal computer, and an operator can judge whether or not the processing is suitable by watching this (step S104 in FIG. 1).

At this time, it is desirable to display the image that has been pasted (the image G1 in this case). In this case, if the operator judges that the composite position is not correct, by moving the image G1 in the horizontal and/or vertical direction by a mouse or the like (not shown in the drawing), he can make a minute adjustment of the composite position. Further, if the operator judges that the connection at the border area has not been made smoothly by visual observation, by dragging any one of the four corners of the image G1, he can enlarge and/or reduce the domain and match the domains in a simple manner by it (step S105 in FIG. 1).

If the operator judges a composition made in this way as suitable, by clicking a OK button B3 shown in FIG. 3, the both images are combined to build a composite image. On the other hand, by clicking the cancel button B2, he can do composition processing over again. Besides, for the composite position and the magnification of enlargement and/or reduction, the values which have been determined in the above-mentioned way may be used as they are, or it is also appropriate to make a minute adjustment on the basis of such determined values in order to raise the precision higher.

Besides, in the example of the embodiment described in the above, composition processing is automatically carried out; however, in the case where the condition of photographing is different for two frames of image G1 and G2, the possibility of suitable composition is lowered, and the frequency of an operator carrying out manual adjustment finally is increased, which increases the burden owing to it. In contrast with this, as an modified example, it can be thought of that, if an operator designates the domain to paste at first, the possibility of suitable composition can be made higher. In the following, such a modified example will be explained.

First, in the same way as the above-mentioned example of the embodiment, an image which has been selected is displayed. Next, the domain on which an image is to be pasted is selected. For example, in the image G1 on the dialogue box D as shown in FIG. 4, the domain R including a main photographic object to be pasted is designated by drawing a rectangle with a mouse or the like (refer to FIG. 3), and after that, the composition button B1 is clicked.

In the case where the composition button B1 is clicked, processing to combine the images G1 and G2 is practiced. In the case of this example, the domain R surrounded by rectangular frame in the image G1 is to be combined to the image G2. The composite position is a position where it is highest the degree of agreement between the background part of the domain R surrounded by the rectangular frame in the image G1 and the background part of the image G2. Concerning the method of calculation, various methods can be thought of, but a method utilizing a template matching as described in the above is desirable.

Next, on the basis of the calculated composite position, the domain R surrounded by the rectangular frame is pasted on the image G2. The processing in doing this will be explained below.

First, the average values of the digital image data values of the respective colors B, G, and R over the whole pixels of the two images G1 and G2 are obtained, and pixel values of G1 or G2 are converted so as to make these average values of one of the images agree with those of the other respectively. By doing this, a natural image composition can be done even in the case where the two images have different color balances.

Further, in pasting two images together, the pixel values in the domain R surrounded by the rectangular frame are added to those in the domain in the image G2 corresponding to the former in a specified proportion. As described in the above, composition can be made without giving a feeling of disorder by it that, in the central part of the domain R, the proportion of pixel values in the domain surrounded by the rectangular frame is made higher, and the nearer a pixel comes to the periphery, the higher it is made the proportion of the pixel value of the domain corresponding to the domain R in the image G2 on which the domain R is to be pasted.

Besides, in the case where the image G1 is pasted after it is enlarged, the portion to be pasted is blurred to make the composite image appear unnatural. In order to improve this point, when template matching is done, if the magnification of enlargement is larger than 1, by pasting the image to the other image which has been reduced, more natural composition can be made.

According to a method of this example of the embodiment, even in the case where it is produced an image composed of superposed photographic objects which have been photographed separately, it is not necessary to photograph an additional image frame of the background only. Further, images having different color balances respectively can be naturally combined to build a composite image. Moreover, even in the case where two images have different distortions caused by the optical characteristics of the lens, it is possible to compose an image in such a manner as to make the border portion smooth automatically or manually.

Incidentally, according to the method of image processing described in the above, although pasting of an image can be done effectively, in the case where the backgrounds are quite different from the beginning, or in the case where different photographic objects are present at the same position, it is difficult to obtain a composite image giving no feeling of disorder completely. On the other hand, by making two shots respectively for two persons standing at positions not overlapping each other in the same background, with a camera fixed on a tripod or the like, a composite image looking as if two persons standing side by side were photographed can be obtained by applying image processing to the two frames of image; however, if a tripod can be used, without carrying out an after-processing such as image processing, an image with two persons standing side by side can be easily obtained by self-timer photographing. In contrast with this, in the second example of the embodiment, even in a situation where no tripod or the like can be utilized, an image which makes the composition processing based on the above-mentioned embodiment easy to be done can be obtained.

Figure 5:
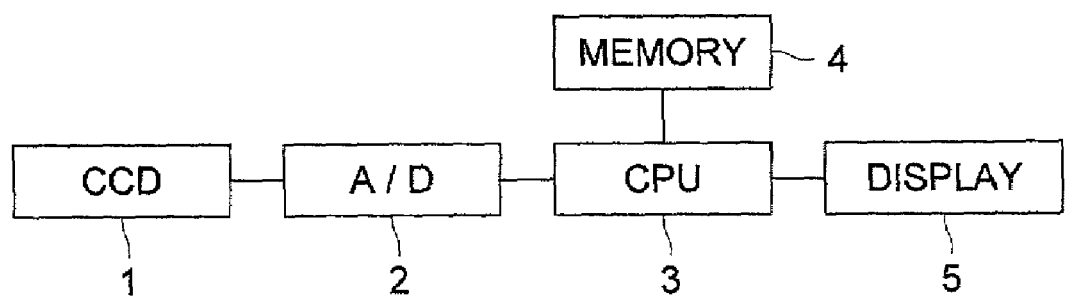
FIG. 5 is a block diagram showing the outline of the structure of an electronic camera, that is, a digital still camera according to the second example of the embodiment.
Figure 6:
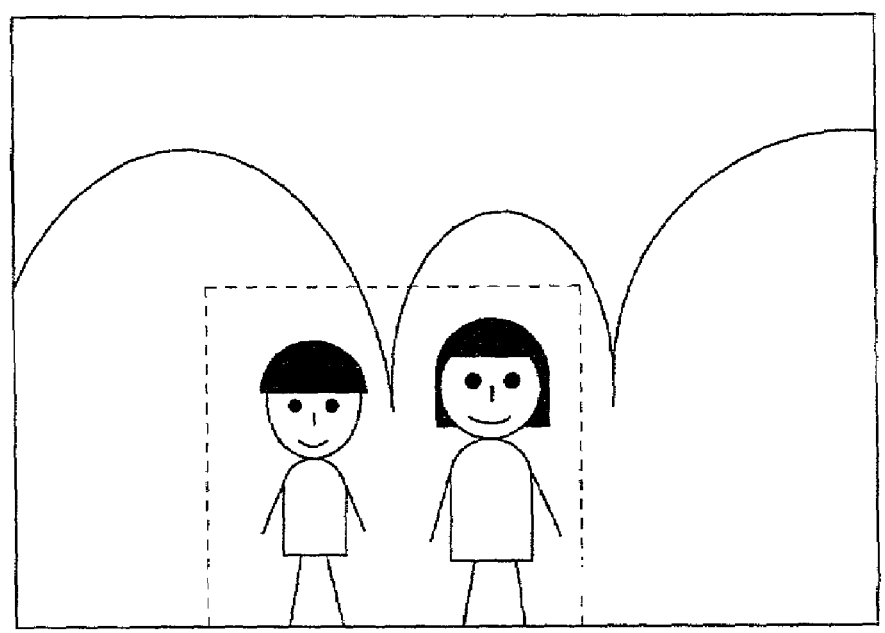
FIG. 6 is an example of an image to be displayed on the display of a digital still camera.

The second embodiment as mentioned in the above will be explained with reference to the drawings. FIG. 5 is a block diagram showing the outline of the structure of an electronic camera, that is, a digital still camera according to the second example of the embodiment. FIG. 6 is an example of an image to be displayed on the display of a digital still camera.

In FIG. 5, an image of a photographic object is converted into image signals by a CCD 1, and the image data which have been obtained through A/D-conversion by an A/D converter 2 are memorized in a memory 4, after they are subjected to image processing in a CPU 3. On the basis of the image data which are memorized in the memory 4, an image is to be displayed on the display 5. Besides, also it can be performed what is called preview display, by which image data obtained by the CCD 1 and the A/D converter 2 can be displayed on the display 5 in real time, regardless of the operation of a release switch (not shown in the drawing).

In addition, the display 5 composes a display means and the CPU 3 composes a means for obtaining a composite position.

Now, in this digital still camera, a "composition" mode can be selected by a switch (not shown in the drawing) In the case where this mode is set, when a first image is photographed, an image with pixels thinned out is displayed on the image display part of the display 5 in a semi-transparent manner.

Further, by the selection of composition mode, the display 5 carries out preview display automatically; that is, as the semi-transparent first image on the image display part is left over, the second image, whose image data are now in process of being taken from the CCD 1 through the A/D converter 2, is displayed in a semi-transparent manner with its pixels thinned out as superposed on the first image (refer to FIG. 6). At this time, it is more desirable that the composite position is obtained through a similar processing to the above-mentioned embodiment, and a composite image made up of the two images in a semi-transparent manner is displayed on the image display part.

While watching the display 5, a shot-making person tries to find a position where the backgrounds coincide suitably with each other, and makes shutter release if they coincide. Besides, for an assistant means for judgement, also it is appropriate that the CPU 3 practices the processing performed in the above-mentioned embodiment, and if the degree of agreement between the first image and the second image is greater than the specified value, it judges that the composition can be correctly made, to notify the shot-making person by giving out a continuous sound or an intermittent sound, or by lighting an LED. In this case, the user may press the shutter button by confirming only that the photographic objects of the both images do not overlap each other. Further in a more improved way, it is more appropriate that shutter releasing action is automatically done when the degree of agreement becomes highest. In addition, it is convenient for the after-processing to be done if it is written in the header part of the image data of the second image, information to the effect that the image is such one that is to be pasted on the first image by composition processing.

As described in the foregoing, according to this example of the embodiment, it can be easily obtained an image which looks as if photographic objects in different image frames were taken in the same shot by combining images obtained by different shots separately; therefore, in such a case as a journey where people cannot carry a tripod, even in the case where one after another becomes a shot-maker to photograph the others, an image looking as if all persons were taken in the same shot together, or a trick image such that two or more figures of the same person are photographed can be easily formed.

Up to now, the examples of the embodiment of this invention have been explained, but this invention should not be construed as limited to the above-mentioned examples of the embodiment, and it is a matter of course that this invention can be suitably modified or improved.

According to this invention, it is possible to provide a method of image processing which is capable of combining two image frames, which have been photographed for two persons separately with one person taken in one of them and the other person in the same background, by image processing to build a composite image looking as if they were photographed as standing side by side, and an electronic camera which makes such composition easy.

What is claimed is:

1. An image processing method of making a composite image from a first photographic image comprising a marked photographic object and a first background and a second photographic image comprising a second photographic object and a second background, wherin the first background and the second background include a common third object, said image processing method comprising:
   calculating a degree of agreement between image data corresponding to the first background and image data corresponding to the second background; and
   pasting an image of the marked photographic object into the second photographic image at a position at which the degree of agreement is highest.

2. The image processing method of claim 1, further comprising designating a domain in the first photographic image, wherein the domain includes the marked photographic object to be pasted.

3. The image processing method of claim 1, further comprising displaying the composite image.

4. The image processing method of claim 1, further comprising at least one of:
   moving a pasting position of the image of the marked photographic object in the second photographic image; and
   enlarging/reducing a domain in the first photographic image, the domain including the marked photographic object to be pasted.

5. The image processing method of claim 1, further comprising processing at least one of image data of the first photographic image and image data of the second photographic image to make an average brightness and color balance of the first photographic image to agree with an average brightness and color balance of the second photographic image.

6. The image processing method of claim 1, further comprising correcting distortion caused by a photographic optical system.

7. An electronic camera, comprising:
   a photographing section to photograph a first photographic image comprising a first object and a first background and a second photographic image comprising a second object and a second background, wherein the first background and the second background include a common third object; and
   a display section to display semi-transparently the first photographic image and the second photographic image such that the second photographic image is superposed on the first photographic image.

8. The electronic camera of claim 7, further comprising:
   an obtaining section to obtain a composite position of the first photographic image and the second photographic image at which the first background and the second background agree with each other;
   wherein the display section superposes the second photographic image on the first photographic image based on the composite position.

9. The electronic camera of claim 7, further comprising:
   a section to obtain a degree of agreement of the first background and the second background; and
   a notifying section to notify when the degree of agreement of the first background and the second background is higher than a specified value.

10. The electronic camera of claim 9, wherein the notifying section emits a sound when the degree of agreement of the first background and the second background is higher than the specified value.

11. The electric camera of claim 7, wherein when a plurality of images are photographed for pasting, information is recorded in a header of at least one of the photographic images to identify the image corresponding to the header and another image as objects of pasting.

* * * * *